Patented Sept. 18, 1945

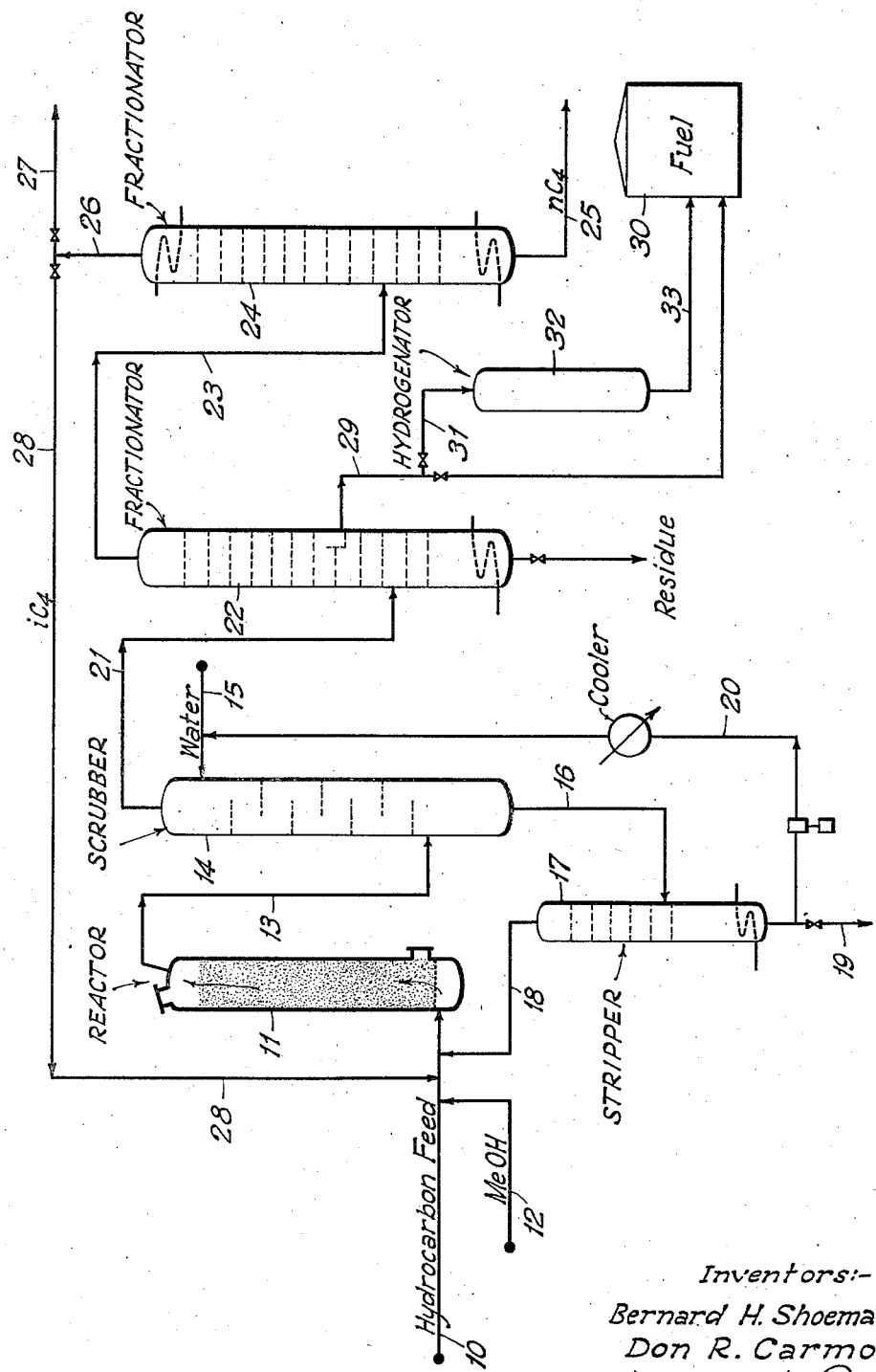

2,384,796

UNITED STATES PATENT OFFICE 2,384,796

MOTOR FUEL SYNTHESIS

Don R. Carmody, Newton, Iowa, and Bernard H. Shoemaker, Hammond, Ind., assignors to Standard Oil Company, Chicago, Ill., a corporation of Indiana Application June 19, 1943, Serial No. 491,486

7 Claims. (Cl. 44—53)

This invention relates to motor fuels and more particularly to a process for making motor fuels of high knock rating from hydrocarbon gases, especially unsaturated hydrocarbon gases of 4 carbon atoms. The invention relates still more particularly to the polymerization and/or alkylation of hydrocarbons with olefinic gases in the presence of a phosphoric acid catalyst. One object of the invention is to improve the knock rating and the volatility of motor fuel resulting from the polymerization or alkylation process when petroleum refinery gas is contacted with phosphoric acid catalyst. Another object of the invention is to effect simultaneous polymerization, alkylation and etherization reactions in a single catalytic conversion zone, thereby producing a fuel containing hydrocarbons and ethers of high knock rating suitable for aviation motor fuel and particularly characterized by high knock rating under supercharging conditions of engine operation.

The invention is illustrated by a drawing which shows diagrammatically an apparatus suitable for carrying out the process. Referring to the drawing, a gaseous hydrocarbon feed stock which may be isobutlyene, or mixtures of propylene and butylenes, or a C4 fraction of cracking still gas is introduced by line 10 to reactor 11. The hydrocarbon feed is preferably supplied in liquid form and at sufficient pressure to maintain it in liquid phase. Pressures of 150 to 500 pounds per square inch are usually sufficient. The reactor 11 is charged with the phosphoric acid catalyst, for example, granular, porous catalyst made by adsorbing phosphoric acid on kieselguhr, silica gel, active carbon, etc. The catalyst is maintained at a temperature of about 100 to 350° F., preferably about 250 to 300° F. Some steam or water may be introduced with the feed to maintain the catalyst at the proper state of hydration.

Simultaneously with the introduction of the hydrocarbon gas thru line 10 there is also introduced a stream of methanol by line 12. In the presence of the catalyst the methanol is found to react with the olefin hydrocarbons producing various ethers of highly branched structure, one of which is methyl tertiary butyl ether. The reaction product is passed by line 13 to scrubber 14 where any unreacted methanol and dimethylether is absorbed by a current of wash liquid, for example water introduced by line 15. The wash liquid withdrawn from the base of the scrubber by line 16 passes to stripper 17 where methanol and methyl ether are driven off thru vapor line 18 leading back to reactor 11. The wash water employed in the scrubbing may be discarded at 19 or recycled by line 20 back to the scrubber 14.

The motor fuel product is conducted by line 21 to fractionator 22 in which a light fraction containing principally normal and isobutane hydrocarbons is removed thru vapor line 23 leading to fractionator 24 wherein the normal butane is removed as a bottom fraction thru line 25 and isobutane is taken overhead thru line 26. The isobutane may be discarded from the system by valved outlet 27 or recycled by line 28 leading back to reactor 11.

An intermediate motor fuel fraction trapped from fractionator 22 is conducted by line 29 leading to storage tank 30 provided for collecting the finished product. This motor fuel fraction besides containing various ethers of high knock rating also contains olefin polymers such as isooctene (2,2,4-trimethylpentene). If desired, the product withdrawn thru line 29 may be conducted by line 31 to a hydrogenating zone 32 wherein olefinic ingredients are hydrogenated in the presence of a hydrogenating catalyst and gaseous hydrogen. The hydrogenated product is then conducted by line 33 to fuel storage tank 30.

When the hydrocarbon feed stock admitted to the process by line 10 is a refinery C4 fraction from cracking operations it will contain all of the C4 hydrocarbons in varying amounts including particularly isobutane, isobutylene and normal butylene. In the presence of methanol introduced thru line 12, the isobutylene is preferentially converted to methyl tertiary butyl ether, a very desirable motor fuel ingredient. The catalyst is thereafter permitted to react with the normal butylene converting it into branched-chain butylene polymers boiling largely within the motor fuel boiling range, or effecting an alkylation reaction between the normal butylene and the isobutane which is present. We may also introduce benzene ($C_6H_6$) into the reaction conjointly with the olefin gases and methanol. Under the conditions of alkylation and etherization existing in reactor 11 the benzene is largely alkylated to substituted benzenes characterized by a desirable knock rating, particularly in aviation motor fuel. Where propylene is present in the feed stock with benzene, the benzene will be preferentially alkylated to cumene.

As an alternative of the process described above, we may employ a petroleum hydrocarbon fraction containing propylene and butylenes to which is added the desired amounts of benzene and methanol. When this feed is processed with a phosphoric acid catalyst under the conditions described above we obtain a fuel rich in isopropylbenzene, methyl tertiary butyl ether and butylene dimer. The dimer is hydrogenated so as to obtain an aviation fuel which is particularly desirable from the viewpoint of volatility and anti-knock characteristics.

It is generally desirable that the ratio of benzene to olefins be of the order of 0.5:1 up to 2:1 mol ratio. Methanol may be charged in sufficient amount to equal the molar concentration of isobutylene, allowance being made for methanol recovered from stripper 17. It is not necessary to obtain complete etherization of isobutylene by the methanol because any unetherized isobutylene is subsequently converted before leaving the catalyst bed in reactor 11 to other desirable products such as isooctene or, when benzene is present, tertiary butyl benzene.

In this application the term "readily alkylatable hydrocarbon" is used to include the isoparaffins such as isobutane and the light aromatic hydrocarbons such as benzene.

By recycling isobutane by line 26 a higher concentration of this hydrocarbon may be maintained in reactor 11, thereby increasing the alkylation of olefines and reducing the amount of butylene dimer produced in the reaction. For this purpose it is generally desirable to maintain the mol ratio of isobutane to n-butylene in the range of about 2 to 5. When benzene is employed as a component of the feed stock the concentration of isobutane may be reduced and isobutane may be prevented from building up in the system to an excessive amount by discarding it thru valved line 27. Any dimethyl ether not removed in scrubber 14 will appear with $C_3$ and $C_4$ hydrocarbons in line 26 and may be recycled.

The temperature of reactor 11 may be maintained in any conventional manner by heating coils or by preheating the stock charged thereto. Although water has been described as a scrubbing medium for use in scrubber 15 to recover methanol and methyl ether from the reactor products, other suitable absorption liquids may be employed for the purpose, for example butyl alcohol, glycerin, glycol and water solutions thereof. The carryover of a small amount of water thru line 18 into reactor 11 is generally advantageous rather than disadvantageous to the catalyst.

As an example of the operation of our process as applied to the treatment of isobutylene and methanol, the following runs were made: A mixture of isobutylene and methanol in the ratio of 1.3 mols of the former to 1 mol of the latter was passed over a catalyst comprised of phosphoric acid on kieselguhr at a pressure of 250 pounds per square inch under the following conditions:

|  | Run No. | | | |
| --- | --- | --- | --- | --- |
|  | 1 | 2 | 3 | 4 |
| Reaction temperature, °F | 295 | 280 | 250 | 255 |
| Rate of thruput—gals./hr./lb. of catalyst | 0.2 | 0.12 | 0.36 | 0.33 |
| Yield of liquid product—weight per cent | 65 | 63 | 52 | 41 |

All products of the above runs are characterized by high knock rating above 100 octane number CFR motor method. Flow rates of about 0.05 to 1 gallon of liquid feed per hour per pound of catalyst are usually satisfactory.

One of the important features of our process is the conversion of a mixed $C_4$ hydrocarbon stream into liquid products boiling in the aviation gasoline boiling range in such a way that the maximum knock rating is obtainable. This we have accomplished by avoiding dimerization of isobutylene, by effecting its etherization with methanol while normal butylene is simultaneously alkylated with other hydrocarbons, preferably isobutane and benzene yielding alkylation products with desirable high knock rating and high supercharged performance.

Another feature of the invention is the advantageous effect of methanol on the phosphoric acid catalyst, increasing its life and efficiency in hydrocarbon conversion.

Although we have described our invention with respect to its application to specific operations, it is intended that the invention be construed in accordance with the following claims:

We claim:

1. The process of making motor fuel of high knock rating which comprises subjecting a mixture of an isoparaffin hydrocarbon and a normally gaseous olefin to the action of a phosphoric acid catalyst under alkylating conditions and simultaneously introducing methanol into the reaction, thereby facilitating the alkylation of said isoparaffin hydrocarbon and producing ethers, resulting in a motor fuel product containing both alkymers and methyl ethers.

2. The process of claim 1 wherein said normally gaseous olefin is isobutylene and the amount of methanol employed is substantially equal to the amount of isobutylene on a molar basis.

3. The process of claim 1 wherein the reaction is conducted at a temperature of about 100 to 350° F.

4. The process of making high knock rating motor fuels which comprises subjecting a mixture of an isoparaffin hydrocarbon, normal butylene and isobutylene to the action of a phosphoric acid catalyst under alkylating conditions at a temperature of about 100 to 350° F., and simultaneously introducing into said catalyst a stream of methanol whereby said isobutylene is converted to methyl tertiary butyl ether and said normal butylene is converted to an alkylation product with said isoparaffin hydrocarbon.

5. The process of making high knock rating motor fuels which comprises subjecting a mixture of isobutane, normal butylene and isobutylene to the action of a phosphoric acid under alkylating conditions at elevated temperature and simultaneously introducing into said catalyst a stream of methanol whereby said isobutylene is converted to methyl tertiary butyl ether and said normal butylene is converted to an alkylation product with isobutane.

6. The process of making high knock rating motor fuels which comprises subjecting an unsaturated $C_4$ fraction of refinery gas containing isobutane and both isobutylene and normal butylene to the action of a phosphoric acid catalyst under alkylating conditions at a temperature of about 250 to 300° F., simultaneously introducing into said reaction a stream of methanol in an amount sufficient to etherize the isobutylene but insufficient to etherize the normal butylene contained in said $C_4$ hydrocarbon fraction, continuing the reaction until said isobutane is substantially alkylated in the presence of said acid and methanol and separating from the reaction a motor fuel consisting essentially of alkamers and ethers boiling in the motor fuel boiling range.

7. The process of making high knock rating motor fuel which comprises subjecting a mixture of an isoparaffin hydrocarbon and an olefin hydrocarbon to the action of a phosphoric acid catalyst under alkylating conditions at a temperature of about 250 to 300° F. and simultaneously introducing into said reaction mixture a stream of methanol whereby said olefin hydrocarbon is partly alkylated with said isoparaffin and partly converted into a methyl-ether derivative and recovering the mixed reaction product for use as said high knock rating motor fuel.

DON R. CARMODY.
BERNARD H. SHOEMAKER.

CERTIFICATE OF CORRECTION.

Patent No. 2,384,796.  September 18, 1945.

DON R. CARMODY, ET AL.

It is hereby certified that error appears in the printed specification of the above numbered patent requiring correction as follows: Page 2, second column, line 38, claim 5, after the words "phosphoric acid" insert --catalyst--; and that the said Letters Patent should be read with this correction therein that the same may conform to the record of the case in the Patent Office.

Signed and sealed this 4th day of December, A. D. 1945.

Leslie Frazer

(Seal)   First Assistant Commissioner of Patents.